April 15, 1924.  1,490,230
G. B. POLLOCK
CUTTER
Filed June 27, 1921
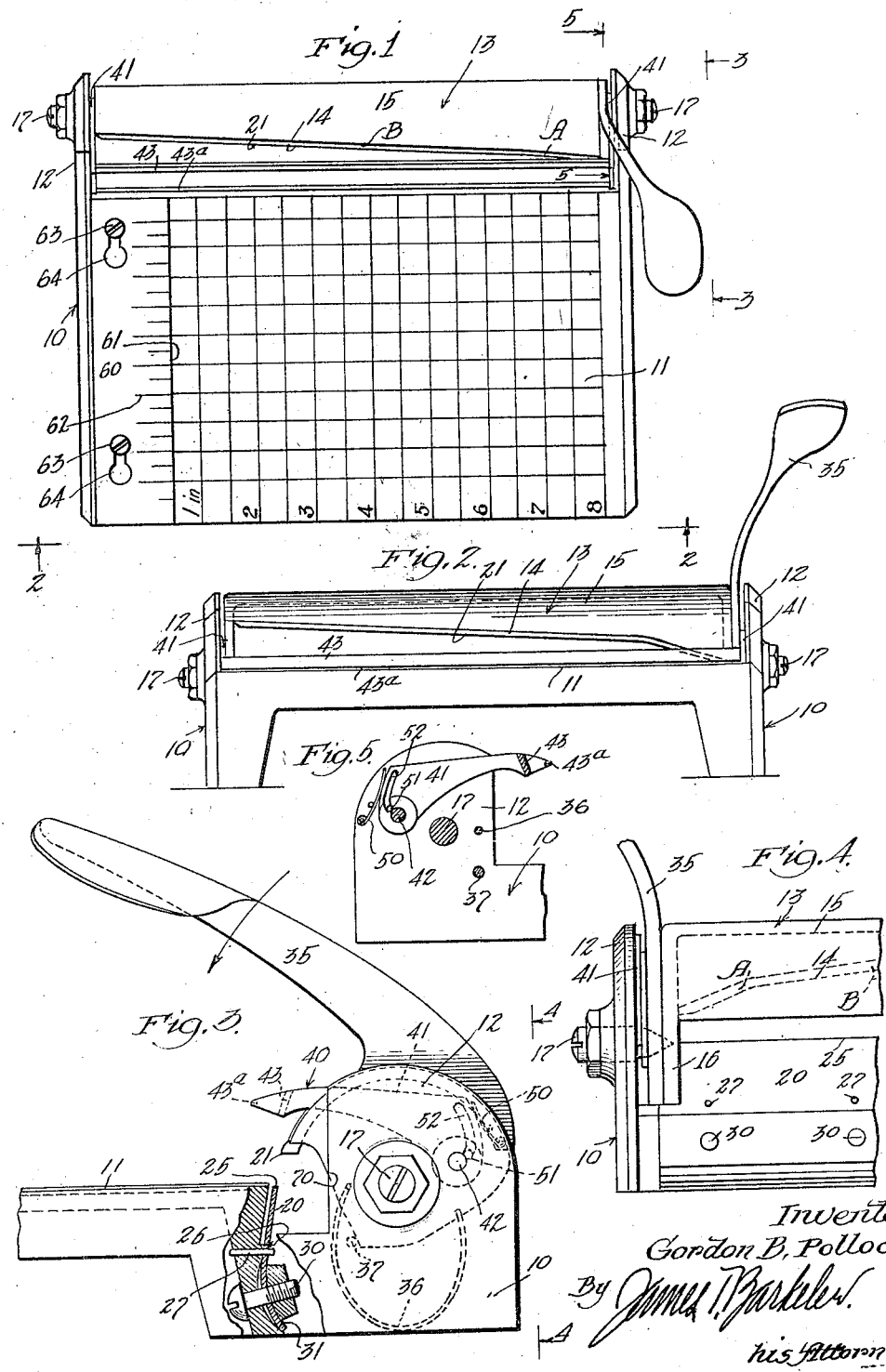
Inventor:
Gordon B. Pollock.
By
his Attorney Patented Apr. 15, 1924.

1,490,230

UNITED STATES PATENT OFFICE.

GORDON B. POLLOCK, OF HOLLYWOOD, CALIFORNIA.

CUTTER.

Application filed June 27, 1921. Serial No. 480,526.

*To all whom it may concern:*

Be it known that I, GORDON B. POLLOCK, a citizen of the United States, residing in Hollywood, county of Los Angeles, State of California, have invented new and useful Improvements in Cutters, of which the following is a specification.

This invention has to do with a cutter and more specifically with a cutter for sheet material such, for instance, as sheet metal, paper, etc., and it is an object of the invention to provide a simple, effective improved device of this general character.

A noteworthy feature of the invention is the relative positioning of the two co-operating cutting members which allows the device to handle sheets of material of great extent and which causes particularly effective accurate cutting.

Another distinctive feature of the invention is the arrangement and manner of mounting of the stationary cutting member. The invention provides for particularly effective co-operation between the cutting members and yet provides a simple, inexpensive arrangement and construction.

Another feature of the invention is the shape or formation of the movable cutting member. This member is shaped to be particularly effective as a cutting member and so that it does not cause curling or shifting of the material being cut as commonly occurs in devices of this character.

The various objects, features and advantages of the present invention will be best and more fully understood from the following detailed description of a typical preferred form of the invention throughout which reference is had to the accompanying drawings, in which—

Fig. 1 is a plan view of the device; Fig. 2 is a front elevation of the device showing it partially operated; Fig. 3 is an enlarged side elevation of a portion of the device with certain parts broken away to show in section; Fig. 4 is a rear elevation of a portion of the device being a view taken as indicated by line 4—4 on Fig. 3; and Fig. 5 is an enlarged detailed sectional view taken as indicated by line 5—5 on Fig. 1.

Throughout the drawings the numeral 10 designates a frame or base, the top surface 11 of which forms a carrier for the material being cut by the device. Brackets 12 extend from the rear end of the base at the sides thereof to support the carrier 13. The carrier 13 carries the movable cutting member or blade 14 and is mounted between the brackets 12 to be rotatable about a fixed axis lying substantially in the plane of the upper surface 11 of the base 10. The carrier comprises a curved shell like body 15 to which the blade 14 is connected, and flat end parts 16 disposed transversely of the body 15 and adapted to receive pivot pins 17 which extend inwardly from the brackets 12. The body 15 of the carrier is curved concentrically with the axis of pivotal mounting thereof and is sufficiently narrow to permit of several sheets of material or a comparatively thick sheet of material being carried on the surface 11 to extend completely under it. The shape of the carrier, generally, is such as to allow the operator to readily see all parts of the material arranged in place to be cut. While the carrier 15 may be of any desired construction it is preferred that it be cast or formed as a single unitary member.

The blade 14 which is at the forward edge of the carrier 15 is adapted to co-operate with the stationary blade 20, mounted on the rear end of the base 10, to cut sheets of material by a shearing action. In the particular device shown in the drawings the blade is integral with the body 15, or is formed by the edge portion of the body 15. The blade 14 has a cutting edge 21 somewhat beyond or outwardly of the body 15 and is preferably substantially helically curved about the axis of pivotal mounting of the carrier. For a short distance at its right hand end of the blade 14 its curvature is steeper or sharper than it is throughout the rest of its length. In the drawings I have designated the steeper portion of the blade 14 by the letter A and the remaining portion, which is preferably of uniform pitch, or curvature, by the letter B.

The stationary blade 20 has a flat upper surface 25 in the plane of the upper surface 11 of the base and the axis of the carrier 13. In accordance with the present invention the blade is a comparatively thin member which bears against a shoulder 26 formed on the base at a point considerably below the surface 11 and is supported by a plurality of suitable pins 27 which extend into it from the base preferably at the shoulder 26. The blade extends upwardly and somewhat rearwardly from the shoulder 26 and pins 27 in the manner illustrated in Fig. 3. The amount that the upper portion of the blade extends rearwardly from the shoulder 26 can be regulated by suitable clamping screws 30 arranged to engage the lower portion of the blade below the shoulder 26 and above shoulder 31, which supports the lower edge of the blade. It will be obvious, from inspection of Fig. 3 of the drawings, how the amount that the upper portion of the blade extends rearwardly towards the movable cutter can be accurately regulated by the screws 30. The screws 30 not only regulate the blade but also hold it in proper engagement with the shoulders 26 and 30 and on the pin 27. The upper portion of the blade 20 is preferably adjusted so that the extreme end of the portion A of blade 14 can be moved downwardly past it but so that the remaining portion of the blade 14 will press it forward slightly in passing downwardly past it. Blade 20 is flexible to allow of the adjusting action above explained, and to allow the blade 20 to be pressed forward by the blade 14, as just explained. The blade 14 can be operated or manipulated to co-operate with the blade 20 by forward movement of the hand lever 35 which extends from one end of the carrier 13. In practice it is preferred to arrange a bow spring 36 between the carrier 13 and one of the brackets 12 to return the carrier to its up position after having been actuated and to normally hold it in the up position as shown in Figs. 3 and 4. A stop pin 37 extends inwardly from one of the brackets 12 to engage suitable shoulders formed on the end of the carrier to limit both the up and down movements of the carrier.

In accordance with the present invention a marginal guide and pressure foot 40 is arranged to co-operate with the carrier 13. The marginal guide and pressure foot 40 comprises two arms 41 suitably connected to the brackets 12 by pivot pins 42, a transverse part 43 which extends between the ends of the arms 41 near their outer ends, and a wire or guide part 43ª which extends between the ends of the arms 41 parallel to and spaced from the part 43. The members 43 and 43ª are both parallel to the stationary blade and therefore the line of cut. Springs 50 are mounted on the brackets 12 to engage the arms 41 and tend at all times to move the marginal gauge and pressure foot downwardly so that the transverse part 43 and guide part 43ª engage the top surface 11, or the material which is arranged on the top surface 11. Pins 51 extend from the ends of the carrier 13 into cam openings 52 in the arms 41. The pins 51 co-operate with the walls of the cam openings 52 to move the marginal gauge and pressure foot to the up position, as shown in Fig. 3, upon movement of the carrier to its up position, and to release the marginal gauge and pressure foot during the first part of the actuation of the carrier. With this arrangement the transverse part 43 and guide part 43ª of the gauge and pressure foot engage the material on the surface 11 before the blades 14 and 20 cooperate to cut it.

It is preferred, although not necessary, that a guide member 60 be mounted at one side of the surface 11 to present a shoulder 61 against which material may be arranged preparatory to being cut. The guide 60 may be provided with suitable graduations 62 and may be detachably mounted on the top 11 by suitable pins 63 extending from the surface 11 to co-operate with openings 64 and the guide 60. Further, in the preferred form of construction the brackets 12 are cut away at 70 to permit of the device being used to cut sheets of material which are wider than it is.

To operate the device the sheet of material to be cut is arranged on the surface 11 so that the part which is to be cut away overhangs, or extends rearwardly of, the blade 20. The marginal gauge and pressure foot 40 and the carrier 13 being in their normal up position allows the material to be arranged in the device to extend under the carrier, or in fact, to extend under and beyond the carrier. After the sheet of material has been properly arranged in the device the hand lever 35 is moved downwardly, as indicated by the arrow in Fig. 3, allowing the marginal gauge and pressure foot to engage the sheet of material. When the marginal gauge and pressure foot is in engagement with the sheet of material the guide part 43ª enables the operator to determine accurately where the material will be cut and at what angle the material will be cut upon further operation. The weight of the marginal gauge and pressure foot together with the action of the spring 50 holds the material tightly against the surface 11 close to the point where the cut is to be made. After the marginal gauge and pressure foot has engaged the material further movement of the hand lever 35, in the direction indicated by the arrow in Fig. 3, will cause the portion A of the blade 14 to co-operate with the stationary blade 20 to start the cut in the sheet of material. The angularity of the portion A of the blade 14 is such as to make the starting of the cut comparatively easy. Immediately after the cut is started in the material by the portion A of blade 14, the portion B of blade 14 starts to cut the material and due to such angularity cuts the material along a comparatively great length at a single time and thus prevents the material from curling and being pressed away from it. The axis of the carrier 13 being in the plane of the surface 11 causes the blade 14 to shear downwardly as nearly as possible at right angles to the sheet of material. The blade 14 in cutting straight downwardly and at right angles to the sheet of material, causes the cut to be perfectly true and causes the cutting action to be particularly effective and efficient. During the cutting by the greater part of the portion A of blade 14 and throughout the entire cutting by the portion B of blade 14, the blades 14 and 20 are in the most effective relative positions due to the adjustment of blade 20 effected by screws 30. In other words, throughout practically the entire cut made by the blade, the blade 20 is held in engagement with the edge 21 of the blade 14 thus causing the shearing action of the blades to be as nearly perfect as possible. Further, the fact that the blade 20 extends somewhat upwardly and rearwardly causes it to tend to bear towards the carrier and the blade 14 when pressure is brought to bear on its surface 25 as is done during the shearing action. The angularity of the blade 20 together with its being pressed towards the blade 14 by the action of the clamping screws 30 causes it to be maintained, throughout practically the entire cut, in a most effective advantageous position relative to the blade 14.

Having described only a typical preferred form of my invention I do not wish to limit myself to the specific detail hereinabove set forth but wish to reserve to myself any changes or variations that may appear to those skilled in the art and that may fall within the scope of the following claims.

Having described a preferred form of my invention, I claim:

1. In a cutter of the character described, a base adapted to carry material, a substantially stationary blade, a movable blade adapted to be moved downwardly to cooperate with the stationary blade, the stationary blade having a part extending freely upwardly and inwardly toward the point where it cooperates with the movable blade, and clamp means in connection with the lower portion of the stationary blade for adjusting the angularity of the upwardly and inwardly extending portion of the stationary blade, said means including a stationary support having spaced parts which support the blade and members engaging the blade between said parts to press the blade toward the support.

2. In a cutter of the character described, a base adapted to carry material, a stationary blade, a movable blade adapted to cooperate with the stationary blade to cut material carried by the base, a pivotally mounted member adapted to be actuated to hold material carried on the base, and cam means operatively connecting the movable blade and said member so that the member is actuated to hold material carried by the base when the movable blade is actuated.

3. In a cutter of the character described, a base adapted to carry material, brackets mounted on the base, a movable blade carried by the brackets and adapted to be actuated to cut material carried by the base, a member pivotally carried by the brackets and adapted to be actuated to engage and hold material carried by the base, and cam means in connection with the movable cutter and said member whereby said member is actuated upon actuation of the movable cutter.

4. In a cutter of the character described, a base adapted to carry material, a stationary blade, a pivoted blade adapted to cooperate with the stationary blade to cut material carried on the base, a pivotally mounted material holding member pivoted eccentrically of the blade pivot and arranged so that when the member is on the material and the pivoted blade is cutting the material the member and blade are close together and when the member and said blade are raised from the material they are then separated; and means whereby movement of said blade causes movement of said member.

5. In a cutter of the character described, a base adapted to carry material, a stationary blade, a pivoted blade adapted to cooperate with the stationary blade to cut material carried on the base, a pivotally mounted material holding member pivoted to swing independently of the pivoted blade, and means acting between said blade and said member to cause the member to move onto material on the base during the first part of the cutting movement of the pivoted blade toward the material.

6. In a cutter of the character described, a base adapted to carry material and having a stationary blade, a pivoted blade mounted on an axis parallel to the stationary blade, the pivoted blade swinging on the surface of a cylinder, and a material holding member in the form of a bar extending parallel and close to the pivoted blade and pivoted on an axis parallel to the blade axis to swing independently of the blade; and means whereby the blade and bar are caused to move cooperatively.

7. In a cutter of the character described, a surface adapted to carry material to be cut, a stationary blade having a cutting edge in the plane of the supporting surface, a rotating cutter including spaced pivotally mounted end parts and a cutter blade extending between the end parts and co-operating with the stationary blade, the pivotal axis being in the plane of the supporting surface and all parts of the rotating cutter except the end parts lying above a plane which is above the plane of the supporting surface and of the axis so as to leave an open space through which material may be extended beyond the movable cutter.

8. In a cutter of the character described, a base adapted to carry material and having a stationary blade, a pivoted blade mounted on an axis parallel to the stationary blade, the pivoted blade swinging on the surface of a cylinder, and a material holding member in the form of a bar extending parallel and close to the pivoted blade and pivoted on an axis parallel to the blade axis to swing independently of the blade; the bar comprising two thin longitudinal members with an open sight space between, one of said members adapted to press down on the material at a point above the stationary blade and the other at a point back from that blade; and means whereby the blade and bar are caused to move cooperatively.

9. In a cutter of the character described, a stationary blade and a movable blade cooperating therewith to cut material, a support for the material, and a material holding member in the form of a double bar, the members of the bar being relatively thin with an open sight space between them, one member adapted to press down on the material close to the stationary blade and the other to press down on the material at a point removed from the stationary blade.

10. In a cutter of the character described, a surface adapted to carry material to be cut, a stationary blade having a cutting edge in the plane of the supporting surface, a rotating cutter including spaced pivotally mounted end parts and a cutter blade extending between the end parts and co-operating with the stationary blade, the pivotal axis being in the plane of the supporting surface and all parts of the rotating cutter except the end parts lying above a plane which is above the plane of the supporting surface and of the axis so as to leave an open space through which material may be extended beyond the movable cutter; the cutting edge of the rotating cutter being diagonal to the axis of the rotating cutter so as to have a shearing action with the stationary blade, the stationary blade being flexible to and from the cutting edge of the rotating blade.

In witness that I claim the foregoing I have hereunto subscribed my name this 14th day of June, 1921.

GORDON B. POLLOCK.

Witness:
VIRGINIA BERINGER.